(12) United States Patent
Herrmann et al.

(10) Patent No.: US 8,393,748 B2
(45) Date of Patent: Mar. 12, 2013

(54) ARRANGEMENT WITH A SEMICONDUCTOR CHIP AND AN OPTICAL WAVEGUIDE LAYER

(75) Inventors: Siegfried Herrmann, Neukirchen (DE); Berthold Hahn, Hemau (DE); Joerg Sorg, Regensburg (DE); Stefan Gruber, Bad Abbach (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 718 days.

(21) Appl. No.: 12/528,960

(22) PCT Filed: Jan. 23, 2008

(86) PCT No.: PCT/DE2008/000124
§ 371 (c)(1),
(2), (4) Date: Sep. 23, 2009

(87) PCT Pub. No.: WO2008/106915
PCT Pub. Date: Sep. 12, 2008

(65) Prior Publication Data
US 2010/0103650 A1    Apr. 29, 2010

(30) Foreign Application Priority Data
Mar. 6, 2007    (DE) .................. 10 2007 010 755

(51) Int. Cl.
*F21V 33/00*    (2006.01)

(52) U.S. Cl. ........ 362/97.3; 362/601; 362/602; 362/612

(58) Field of Classification Search .................. 362/601, 362/97.3, 97.1, 97.2, 555, 612, 613, 602, 362/603, 604, 30; 359/511, 599
See application file for complete search history.

(56) References Cited

U.S. PATENT DOCUMENTS

| | | | |
|---|---|---|---|
| 4,714,983 A * | 12/1987 | Lang | ................................ 362/27 |
| 6,371,623 B1 | 4/2002 | Toyoda | |
| 6,598,987 B1 | 7/2003 | Parikka | |
| 6,935,764 B2 | 8/2005 | Choi et al. | |
| 7,222,993 B2 * | 5/2007 | Kikuchi et al. | ................ 362/300 |

(Continued)

FOREIGN PATENT DOCUMENTS

| | | |
|---|---|---|
| CN | 1466005 A | 1/2004 |
| CN | 1852626 A | 10/2006 |

(Continued)

OTHER PUBLICATIONS

Schnitzer I., et al., "30% External Quantum Efficiency from Surface Textured, Thin-Film Light-Emitting Diodes", Applied Physics Letters 63, Oct. 18, 1993, pp. 2174-2176, American Institute of Physics.

*Primary Examiner* — Laura Tso
(74) *Attorney, Agent, or Firm* — Slater & Matsil, L.L.P.

(57) ABSTRACT

An arrangement includes a semiconductor chip, which is designed to emit light during operation, and a cover layer, which lies across from the light-emitting surface of the semiconductor chip, such that light emitted from the semiconductor chip penetrates into the cover layer. In an area of the cover layer, overlapping with the chip, a light deflecting structure is provided by means of which light penetrating into the cover layer is deflected. The cover layer acts as an optical waveguide and is designed to emit the light such that it is distributed over the upper surface of cover layer.

21 Claims, 5 Drawing Sheets

U.S. PATENT DOCUMENTS

| | | | |
|---|---|---|---|
| 7,287,891 B1 * | 10/2007 | Park et al. | 362/555 |
| 7,334,933 B1 * | 2/2008 | Simon | 362/615 |
| 2001/0003504 A1 | 6/2001 | Ishihara et al. | |
| 2002/0054489 A1 | 5/2002 | Hirayama | |
| 2003/0015959 A1 | 1/2003 | Tomoda et al. | |
| 2005/0265029 A1 | 12/2005 | Epstein et al. | |
| 2006/0002150 A1 | 1/2006 | Kim | |
| 2006/0072339 A1 | 4/2006 | Li et al. | |
| 2007/0001182 A1 | 1/2007 | Schardt et al. | |
| 2007/0002566 A1 | 1/2007 | Wu et al. | |
| 2007/0019394 A1 | 1/2007 | Park et al. | |
| 2008/0137335 A1 * | 6/2008 | Tsai et al. | 362/247 |
| 2009/0129058 A1 * | 5/2009 | Tokita et al. | 362/97.2 |

FOREIGN PATENT DOCUMENTS

| | | |
|---|---|---|
| DE | 10 2005 042 523 A1 | 12/2006 |
| DE | 10 2005 055 293 A1 | 2/2007 |
| EP | 1 589 590 A2 | 10/2005 |
| JP | 08-007614 | 12/1996 |
| JP | 09-269416 A | 10/1997 |
| JP | 2002-169153 A | 6/2002 |
| JP | 2002-203415 A | 7/2002 |
| JP | 2006-078989 A | 3/2006 |
| WO | WO 2006/007097 A1 | 1/2006 |

* cited by examiner

ARRANGEMENT WITH A SEMICONDUCTOR CHIP AND AN OPTICAL WAVEGUIDE LAYER

This patent application is a national phase filing under section 371 of PCT/DE2008/000124, filed Jan. 23, 2008, which claims the priority of German patent application 10 2007 010 755.4, filed Mar. 6, 2007, each of which is incorporated herein by reference in its entirety.

TECHNICAL FIELD

The invention relates to an arrangement with a semiconductor chip, which is designed to emit light during operation, and with a cover layer, which lies across from the light-emitting surface of the semiconductor chip such that light emitted from the semiconductor chip penetrates into the cover layer.

BACKGROUND

A conventional construction of semiconductor devices includes a cover layer that protects the semiconductor chip and provides for an output coupling of the light.

An application area for light emitting semiconductor devices is the backlighting of displays. For this, the light generated by a light emitting diode must be distributed onto a large surface, for which light conducting plates or light conducting films are used. There, the light is emitted by such a light conducting plate over a large surface onto the rear side of a display layer from behind. Such an arrangement is disclosed in the Japanese patent publication JP 08007614. With the arrangement shown there, light is coupled laterally into the optical waveguide plate. A diffusor raster that is printed onto the lower side of the optical waveguide plate provides an improved output coupling of the light. A disadvantage of the arrangement shown is that it is relatively large and expensive.

SUMMARY

In one aspect, the invention discloses an arrangement with a semiconductor chip, which can be used as a backlighting unit, and which at the same time, is smaller and easier to build.

According to one embodiment, with an arrangement as described above, a light deflecting structure is provided in a region of the cover layer overlapping the chip, through which light that has penetrated into the cover layer is deflected in the direction of the longitudinal extent of the cover layer. There, the cover layer acts as an optical waveguide, and is designed to emit the light so that it is distributed over the top surface of the cover layer.

Owing to the configuration according to the invention, the arrangement is small and can be produced in one piece. It is not necessary to interconnect a light emitting diode and an optical waveguide plate; rather, the cover layer of the semiconductor chip simultaneously takes on the function as an optical waveguide plate or film. The deflecting structure ensures that light coupled into the cover layer is not emitted in the same direction, but rather is deflected into the cover layer such that it is distributed over the longitudinal extent of the cover layer, and thus, can be coupled out in areas of the cover layer at a distance from the chip. It is advantageous if an optically structured film, which contains the cover layer, is in direct contact with the semiconductor top surface, or is connected to a contact layer fastened to the semiconductor surface. Thus, the film and the semiconductor chip form an integral unit.

In a preferred embodiment of the invention, the semiconductor chip is a substrateless thin film chip, which preferably has two opposing main directions of emission. A thin film light emitting diode chip is characterized, in particular, by the following characteristic features:

the epitaxial layer sequence comprises a thickness in the range of 20 µm or less, in particular, in the 10 µm range, and the epitaxial layer sequence comprises at least one semiconductor layer with at least one surface that comprises a mixing structure that in the ideal case leads to a nearly ergodic distribution of the light in the epitaxial layer sequence, i.e., it comprises a maximally ergodic stochastic scattering behavior.

A thin film light emitting diode chip is a good approximation to a Lambertian surface emitter.

A basic principle of a thin film light emitting diode chip is described, for example, in I. Schnitzer, et al., Appl. Phys. Lett. 63 (16), Oct. 18, 1993, pp. 2174-2176, whose disclosed content is hereby incorporated by reference.

The embodiment as a thin film chip has the advantage that the arrangement is very thin. The embodiment as a two-sided emitting chip has the advantage that a backlighting unit built with the arrangement according to the invention can emit light in two directions; or if light is to be emitted in only one direction, losses in the otherwise used substrate can be prevented.

In an advantageous embodiment of the invention, a reflective coating is provided on the upper side of the cover layer facing away from the semiconductor chip, such that an emission in the main emission direction of the semiconductor chip is prevented or reduced in the area above the semiconductor chip.

The light deflecting structure is preferably realized using optical elements, which are integrated into the cover layer, wherein, in particular, prisms, lenses or diffraction gratings can be used. In these cases, the light deflecting structure can be formed in the cover layer itself, or on top of the layer, or between the semiconductor chip and the cover layer.

Furthermore, it is possible to provide a layer composed of a photonic crystal for the light deflection. It is also possible for the cover layer to have a holographic structuring.

Furthermore, it is advantageous to provide surface diffusors or volume diffusors in or on the cover layer. By means of the diffusors, light is scattered in different directions, so that a particularly uniform emission characteristic arises.

In an advantageous extension of the invention, a combination of multiple films, which have a different structuring and/or different refractive indices, is provided as a cover layer. There, the interface between the films effects additional reflections and refractions.

It is also particularly favorable to provide an electrically conducting structure between the surface of the semiconductor chip and the cover layer, for contacting the semiconductor chip.

In another advantageous extension, a converter material can be provided in the cover layer that has a luminescent material, which after excitation by light with a first wavelength, emits light with a second wavelength. Thereby it is possible to generate mixed light which is composed of a primary radiation emitted by the semiconductor chip and a secondary radiation generated by the luminescent material. Such mixed light can be, for instance, white light that is, for example, composed of blue primary radiation and yellow secondary radiation.

BRIEF DESCRIPTION OF THE DRAWINGS

In the following, the invention is explained in more detail using exemplary embodiments, as shown in the figures.

DETAILED DESCRIPTION OF ILLUSTRATIVE EMBODIMENTS

Figure 1:
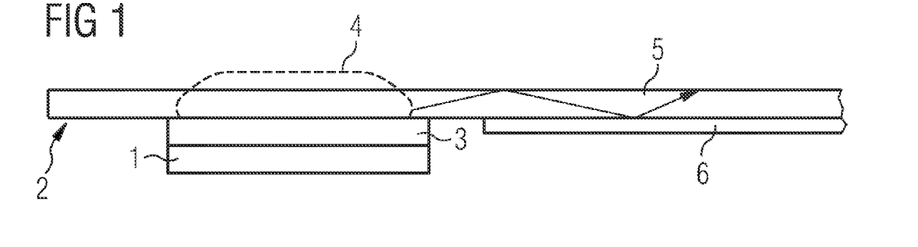
FIG. 1 shows a schematic illustration of an arrangement with a semiconductor chip and an optical wave-guiding cover layer.

In FIG. 1, the fundamental design of an arrangement with a semiconductor chip 1 and a cover layer 2 according to the invention is represented. The semiconductor chip includes a layer stack, of which two layers are represented in the exemplary embodiment shown. If the semiconductor chip is produced in thin film technology, its thickness is preferably less than 20 micrometers, for example, 7 micrometers. But a substantially thicker semiconductor chip can also be used, which has a thickness, for example, of 150 micrometers. On its upper side, the semiconductor chip 1 is connected to a cover layer 2, which includes an optically transparent or partially-transparent material. The cover layer 2 takes on the function of distributing the light emitted by the semiconductor chip 1 onto a large area, so that it can be used, for example, for backlighting a display. The emission direction of the semiconductor chip 1 at its upper surface 3 is mainly perpendicular to its light emitting upper side or lower side, and not in the direction of the longitudinal extent of the cover layer 2. According to the invention, in the area of the semiconductor chip 1, a light deflecting structure 4 is provided through which the light is deflected, in order to disperse the light into the cover layer 2, wherein the cover layer 2 acts as an optical waveguide plate or optical waveguide film.

Optically clear, transparent materials can be used as a material for the cover layer 2, however, semi-clear, transparent materials with a clouding effect, for example, can be also used, wherein the clouding effect is caused, for example, by inhomogeneities in the material. It is important that translucent materials are used, which can also contain, for example, luminescent materials. The cover layer preferably has a thickness between 30 micrometers and 300 micrometers.

The arrangement according to FIG. 1 is designed to emit light mainly upwards. For this reason, a reflective coating 6 is provided on the lower side of the cover layer 2, so that light is prevented from leaving the cover layer in the downwards direction. Thus, light can emerge solely at the upper side 5. Depending on the construction of the semiconductor chip 1, it is provided that it also has a light reflecting layer on its lower side, in order to prevent an emission in the downward direction. Instead, all light should be coupled into the cover layer 2, and deflected in the direction of its longitudinal extent.

Figure 2:
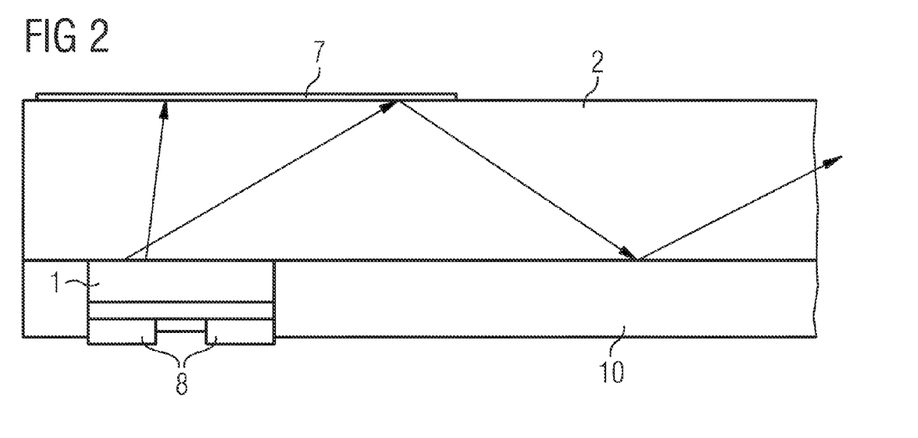
FIG. 2 shows an arrangement according to the invention with a reflective coating on the top side of the cover layer.

FIG. 2 shows how to prevent the possibility that light becomes visible predominantly in the main emission direction of the semiconductor chip 1 on the upper side of the cover layer 2. To this end, on the upper side of the cover layer 2 in the area above the semiconductor chip 1, a reflective coating 7 is provided that reflects light incident there back in a downward direction, and thus, provides the possibility to deflect the light again in the longitudinal extent of the cover layer 2. In this manner, it is prevented that a luminous spot becomes visible on the upper side of the cover layer in the area of the semiconductor chip 1.

In the illustration of FIG. 2, the semiconductor chip 1 is provided with two contact surfaces 8, in order to supply the semiconductor chip 1 with an operating current. The arrangement of the contact surfaces 8 is to be viewed as schematic; naturally, the contacts must be connected to the relevant areas of the semiconductor for a power supply, that is, one of the contact surfaces must be connected to the upper layer of the semiconductor chip 1. This comment applies also to the other Figures, which are described in the following. The gap between the semiconductor chip 1 and the cover layer 2 can be filled with a coupling medium 12 (see FIGS. 6A-6F), in order to produce a connection between the semiconductor chip 1 and the cover layer 2.

The chip shown in the exemplary embodiment of FIG. 2, has two contact surfaces which are both disposed on the lower side of the chip 1. Other chips are designed so that one bond must be made on the upper side and one on the lower side. With such chips, the coupling layer 12 is preferably used in order to dispose optically transparent, but electrically conducting structures there, which serve the purpose of bonding the upper side of the semiconductor chip 1.

The optical wave-guiding film shown in FIG. 2 is composed of the cover layer 2 on the one side and a second layer 10 on the other side, so that a two layer film is formed. The interface between the cover layer 2 and the layer 10 lying beneath, which forms the lower boundary of the cover layer 2, as well as the lower side of this layer 10 can be structured or coated in order to influence the beam path of the light in the cover layer 2 in the desired manner.

Figure 3:
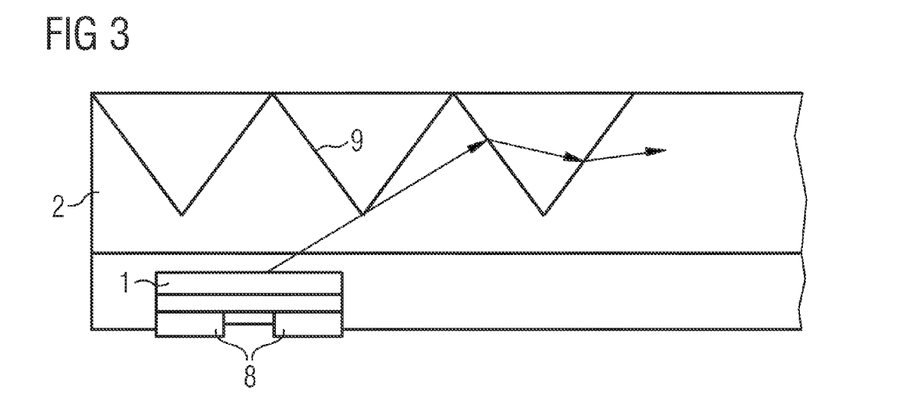
FIG. 3 shows an arrangement according to the invention with a prism structure in the cover layer.

In the exemplary embodiment shown in FIG. 3, prisms are formed in the cover layer 3 in the area above the semiconductor chip 1, which due to a discontinuity 9 in the refractive index at the interfaces formed by the prisms, refract the light emitted from the semiconductor chip 1 in the direction of the longitudinal extent of the cover layer 2. The mode of action is represented by way of an example using a beam of light. While the material of the cover layer 2 has a relatively high refractive index, a material with a refractive index that is as low as possible must be present on the other side of the interface. It can be also simply air, if the recesses produced during the production of the prisms are not filled in with a different material, but rather, remain open.

Figure 4:
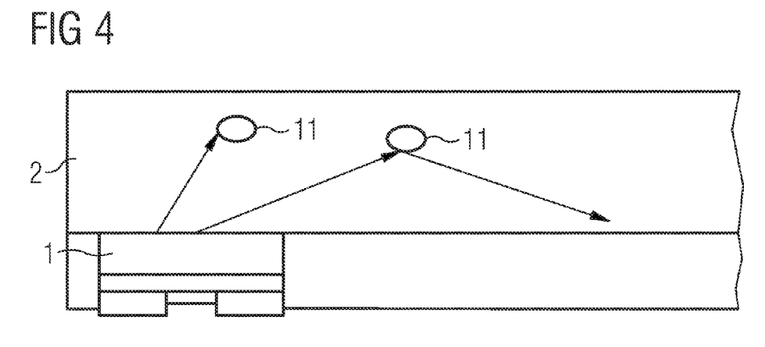
FIG. 4 shows an arrangement according to the invention with volume diffusors in the cover layer.

With the exemplary embodiment represented in FIG. 4, diffusor particles 11 are provided in the cover layer 2, which effect a scattering of the light emitted from the semiconductor chip 1. Diffusor particles are composed of, for example, titanium dioxide. This has a high refractive index of approximately 2.8, which causes total reflections or at least strong refractions to occur at the interface of the diffusor particles 11 with the material of the cover layer 2, so that incident light is deflected.

Figure 5:
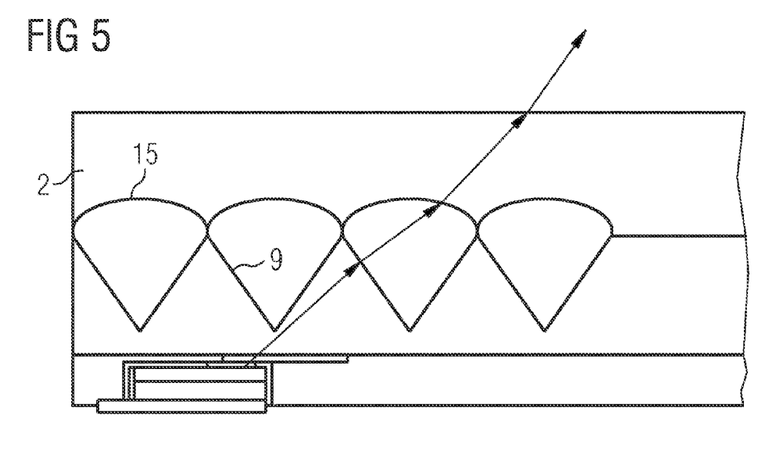
FIG. 5 shows an arrangement according to the invention with a multilayer construction and a prism structure.

In the exemplary embodiment of FIG. 5, a two layer cover layer 2 is provided. The lower layer is equipped with prisms as described based on FIG. 3, whereas the upper layer has concave recesses 15, which lie opposite the prism recesses. The recesses in the upper layer act as lenses and can be used in order to additionally influence the emission characteristics.

In the FIGS. 6A to 6F different light deflecting structures are shown, that can be used in the scope of the invention in order to deflect the light emitted from the semiconductor chip 1 into the longitudinal extent of the cover layer 2. The different exemplary embodiments have in common that a semiconductor chip 1 is connected to the cover layer 2 via a coupling layer 12. The respective configuration of the cover layer 2 is different in each case.

Figure 6A:
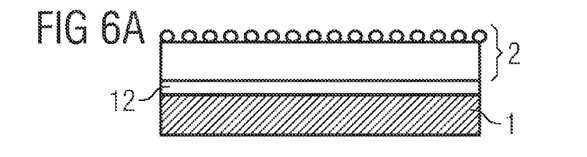
FIGS. 6A to 6F show different examples of a light deflecting structure.
Figure 6B:
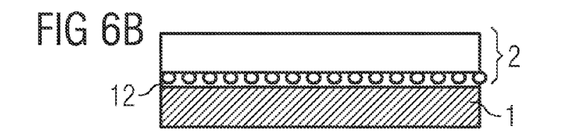
Figure 6C:
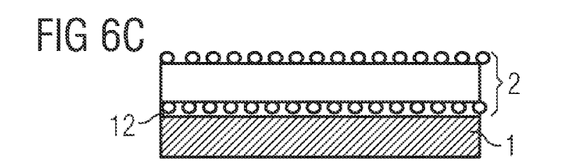
Figure 6D:
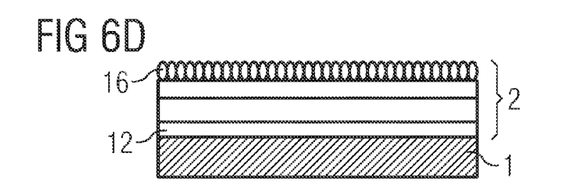
Figure 6E:
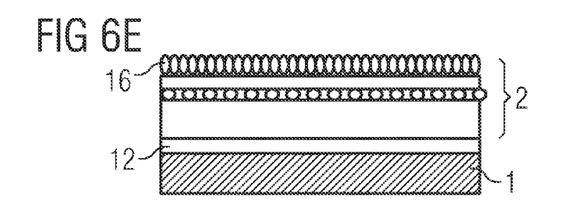

In FIG. 6A, as a cover layer 2, a transparent film, for example, a glass film, is provided that is optically structured on the upper side. According to FIG. 6B, the glass film is optically structured on the lower side. According to FIG. 6C, the optical structuring is provided on the lower side as well as on the upper side. Here, the structuring can be formed such that the output coupling efficiency of the chip is increased. In FIG. 6D, an exemplary embodiment is shown in which a schematically represented layer composed of a photonic crystal 16 is provided on the upper side. In FIG. 6E an arrangement is shown, in which both an optical structuring within the cover layer, and a photonic crystal 16 on the upper side are provided.

Figure 6F:
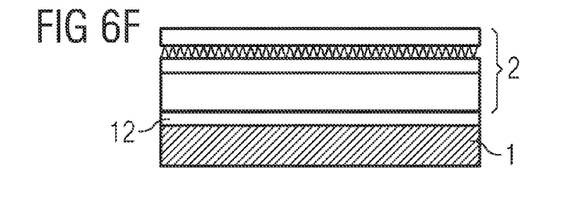

In FIG. 6F, an advantageous embodiment is shown in which a converter layer and the electrical layers are additionally provided.

Figure 7:
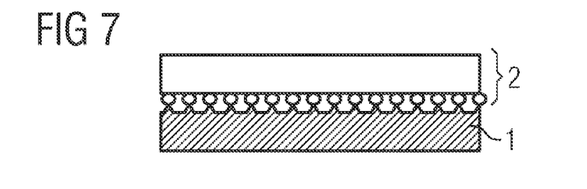
FIG. 7 shows a further exemplary embodiment of a light deflecting structure.

In the embodiment according to FIG. 7, the upper surface of the semiconductor chip 1 is provided with a roughened structure, and is brought into contact with a structured side of a cover layer 2. The light distribution in the cover film 2 is influenced by the different interface combinations. There, regular or randomly structured upper surfaces are possible.

Figure 8:
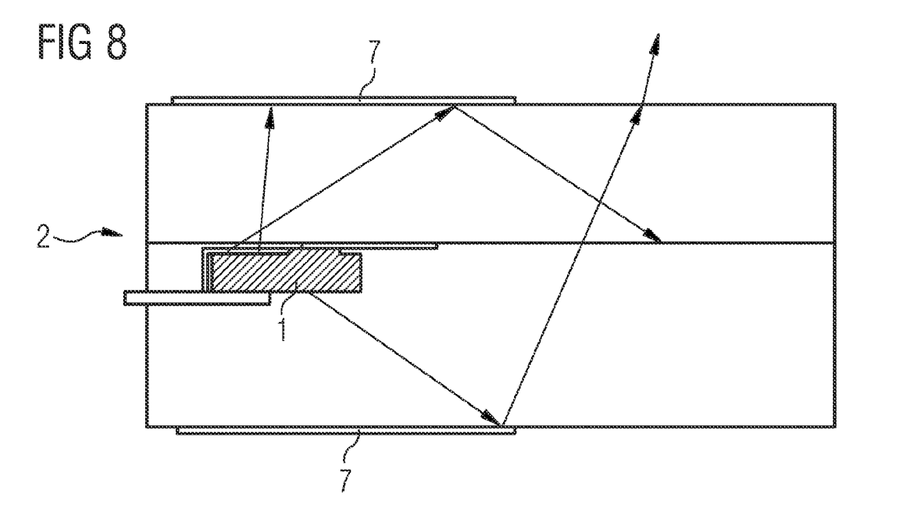
FIG. 8 shows an arrangement according to the invention with a two-sided emitting thin film semiconductor chip.

FIG. 8 shows a substrateless semiconductor, emitting on two sides, built in thin film technology, which is covered on both sides. Advantageously with this embodiment, no losses arise in a substrate; rather the light emitted towards both sides can be used. The light emitted both upwards and downwards is reflected at reflective coatings 7, and thereby forced into the longitudinal direction of the cover layer 2, which forms an optical waveguide film.

Figure 9:
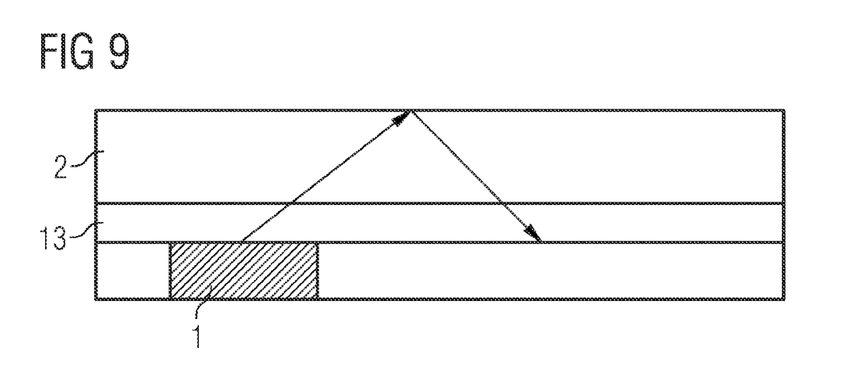
FIG. 9 shows an arrangement according to the invention with a converter layer.
Figure 10:
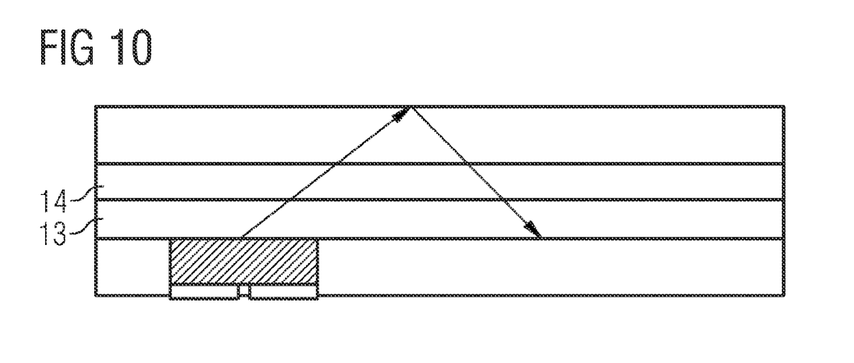
FIG. 10 shows an arrangement according to the invention with two converter layers.

FIGS. 9 and 10 show that the arrangement according to the invention can also be used with converter layers, which convert a part of the primary radiation generated by the semiconductor chip into secondary radiation, wherein mixed light made up of the primary and secondary radiation is emitted. This can be white light that is composed of blue primary radiation and yellow secondary radiation. Here, the converter layer 13 is disposed between the semiconductor chip 1 and the cover layer 2. Preferably an inorganic luminescent material is used as a converter material. With the embodiment according to FIG. 10, two converter layers 13 and 14 are provided in order to facilitate a more complex color mixture. In addition, the second converter layer 14 can be used also to convert a UV component in the primary radiation into visible light in order thus to attain a higher degree of efficiency.

Figure 11:
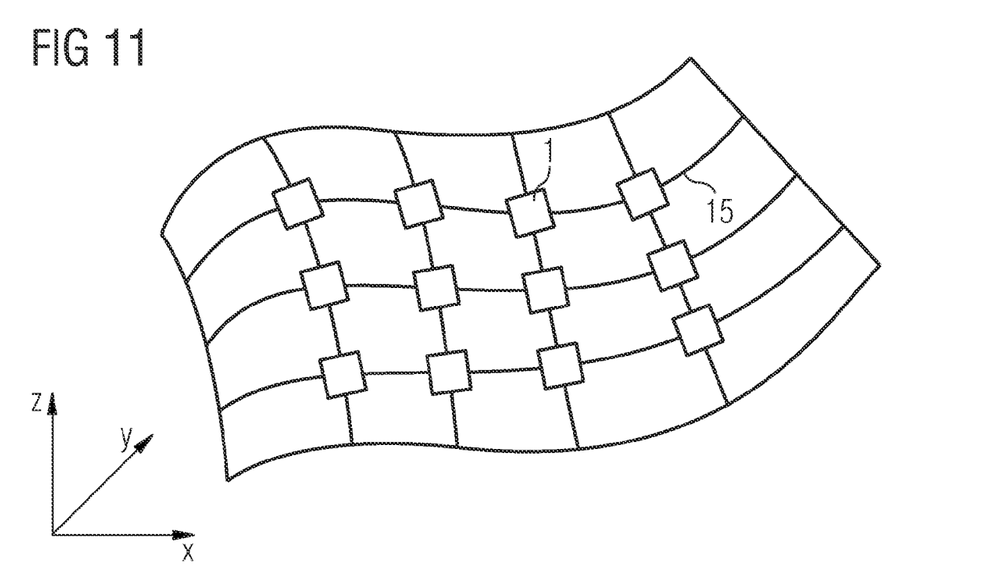
FIG. 11 shows an arrangement according to the invention with flexible conductor paths.

As is shown in FIG. 11, in combination with flexible conductors 15, thin, flat, three-dimensional configurable lighting elements can be created. Thus, for example, a cylindrical arrangement can be produced which emits light over the entire outer surface. Also, forms of backlighting can be produced which follow a curved surface. An exemplary application is the use in automobile headlights or taillights. But also in general illumination, such illumination elements can used in a variety of ways due to their three-dimensional formability.

The different measures, described in the exemplary embodiments, for deflecting light generated by the semiconductor chip 1 into the longitudinal extent of the cover layer 2 can be combined with each other in order to thus attain an optimal mode of operation. Further embodiments of the invention, even if they are not explicitly described, are encompassed by the invention, and are within the judgment of the person skilled in the art.

The invention claimed is:

1. An arrangement comprising:
a semiconductor chip designed to emit light during operation;
a cover layer that lies across from a light emitting upper surface of the semiconductor chip so that light emitted from the semiconductor chip penetrates into the cover layer; and
a light deflecting structure disposed in an area of the cover layer overlapping the chip, wherein light penetrating into the cover layer is deflected in a direction of a longitudinal extent of the cover layer,
wherein the cover layer acts as an optical waveguide and is designed to emit the light distributed over the surface of the cover layer, and
wherein a direction pointing in a direction of the cover layer is a main emitting direction of the semiconductor chip and the semiconductor chip is a substrateless thin film chip or wherein the semiconductor chip has two main emitting directions, which are opposed to each other.

2. The arrangement according to claim 1, wherein the semiconductor chip has a thickness between 7 and 20 µm.

3. The arrangement according to claim 1, wherein the cover layer is a film, composed of an optically clear transparent material, or a semi-clear transparent material, or a translucent material.

4. The arrangement according to claim 1, further comprising a reflective coating on an upper side of the cover layer facing away from the semiconductor chip the coating having essentially a size of the light emitting upper surface of the semiconductor chip.

5. The arrangement according to claim 1, further comprising a reflective coating provided outside an area of the semiconductor chip on a side of the cover layer pointing in a direction of the semiconductor chip.

6. The arrangement according to claim 1, wherein the cover layer is in direct contact with the light emitting upper surface of the semiconductor chip.

7. The arrangement according to claim 1, further comprising optical elements integrated into the cover layer for light deflection.

8. The arrangement according to claim 1, further comprising a layer composed of a photonic crystal that is provided for light deflection.

9. The arrangement according to claim 1, wherein the arrangement has a thickness between 30 and 300 µm.

10. The arrangement according to claim 1, further comprising surface diffusors on the cover layer.

11. The arrangement according to claim 1, further comprising volume diffusors in the cover layer.

12. The arrangement according to claim 1, further comprising a holographic structuring in the cover layer.

13. The arrangement according to claim 1, wherein the cover layer comprises a combination of multiple films, which have at least one of the following: a different structuring and different refractive indices.

14. The arrangement according to claim 1, further comprising a layer composed of a coupling medium disposed between the cover layer and the light emitting upper surface of the semiconductor chip.

15. The arrangement according to claim 14, wherein the layer disposed between the cover layer and the light emitting upper surface of the semiconductor chip contains an electrically conducting optical structure for electrically contacting the semiconductor chip.

16. The arrangement according to claim 1, wherein a converter material is provided in the cover layer, the converter material composed of a luminescent material, which after excitation by light of a first wavelength emits light of a second wavelength.

17. The arrangement according to claim 1, wherein the arrangement includes both a structuring of the cover layer and a layer composed of a photonic crystal.

18. A method of backlighting a display, the method comprising:
   providing an arrangement that includes a semiconductor chip, a cover layer that lies across an upper surface of the semiconductor chip, and a light deflecting structure in an area of the cover layer overlapping the chip;
   emitting light from the upper surface of the semiconductor chip so that light emitted from the semiconductor chip penetrates into the cover layer; and
   deflecting light penetrating into the cover layer in a direction of a longitudinal extent of the cover layer, such that the cover layer acts as an optical waveguide and emits the light distributed over a surface of the cover layer;
   wherein a direction pointing in a direction of the cover layer is a main emitting direction of the semiconductor chip and the semiconductor chip is a substrateless thin film chip or wherein the semiconductor chip has two main emitting directions, which are opposed to each other.

19. An arrangement comprising:
   a semiconductor chip designed to emit light during operation;
   a cover layer that lies across from a light emitting upper surface of the semiconductor chip so that light emitted from the semiconductor chip penetrates into the cover layer, wherein the cover layer acts as an optical waveguide and is designed to emit the light distributed over the surface of the cover layer; and
   a light deflecting structure disposed in an area of the cover layer overlapping the chip, wherein light penetrating into the cover layer is deflected in a direction of a longitudinal extent of the cover layer,
   wherein:
   the arrangement further comprises a layer composed of a photonic crystal that is provided for light deflection; or
   the arrangement further comprises a holographic structuring in the cover layer; or
   the cover layer comprises a combination of multiple films, which have at least one of the following: a different structuring and different refractive indices.

20. An arrangement comprising:
   a semiconductor chip designed to emit light during operation;
   a cover layer that lies across from a light emitting upper surface of the semiconductor chip so that light emitted from the semiconductor chip penetrates into the cover layer, wherein the cover layer acts as an optical waveguide and is designed to emit the light distributed over the surface of the cover layer;
   a light deflecting structure disposed in an area of the cover layer overlapping the chip, wherein light penetrating into the cover layer is deflected in a direction of a longitudinal extent of the cover layer; and
   a layer composed of a coupling medium disposed between the cover layer and the light emitting upper surface of the semiconductor chip, wherein the layer disposed between the cover layer and the light emitting upper surface of the semiconductor chip contains an electrically conducting optical structure for electrically contacting the semiconductor chip.

21. An arrangement comprising:
   a semiconductor chip designed to emit light during operation;
   a cover layer that lies across from a light emitting upper surface of the semiconductor chip so that light emitted from the semiconductor chip penetrates into the cover layer; and
   a light deflecting structure disposed in an area of the cover layer overlapping the chip, wherein light penetrating into the cover layer is deflected in a direction of a longitudinal extent of the cover layer,
   wherein the cover layer acts as an optical waveguide and is designed to emit the light distributed over the surface of the cover layer; and
   wherein a converter material is provided in the cover layer, the converter material composed of a luminescent material, which after excitation by light of a first wavelength emits light of a second wavelength.

* * * * *

UNITED STATES PATENT AND TRADEMARK OFFICE
CERTIFICATE OF CORRECTION

PATENT NO. : 8,393,748 B2  Page 1 of 1
APPLICATION NO. : 12/528960
DATED : March 12, 2013
INVENTOR(S) : Herrmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

First Day of September, 2015

Michelle K. Lee
*Director of the United States Patent and Trademark Office*